May 9, 1950            B. E. HOOVER            2,506,641
FABRICATED GEAR AND METHOD OF MAKING THE SAME
Filed July 27, 1946
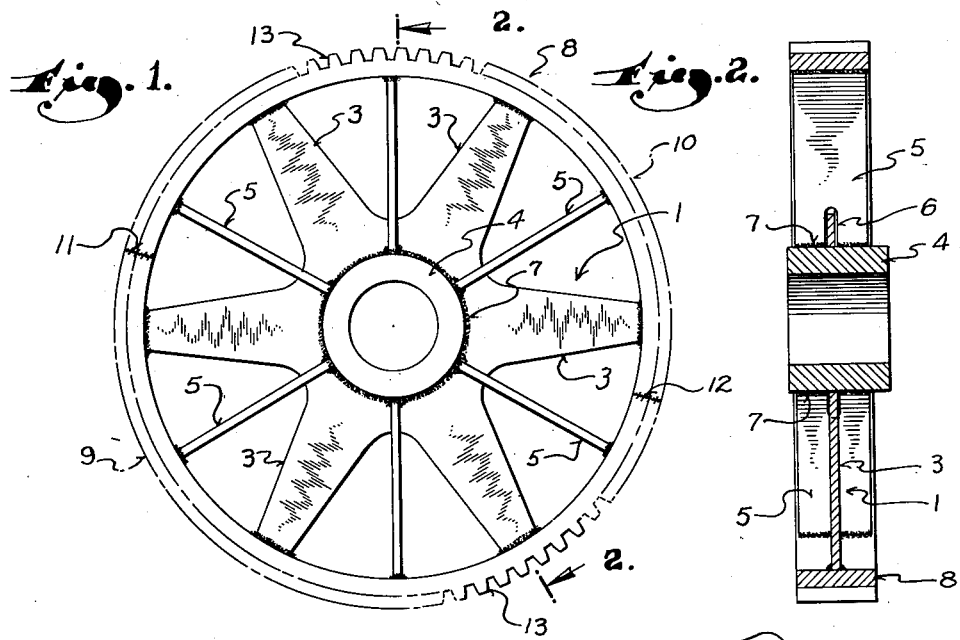
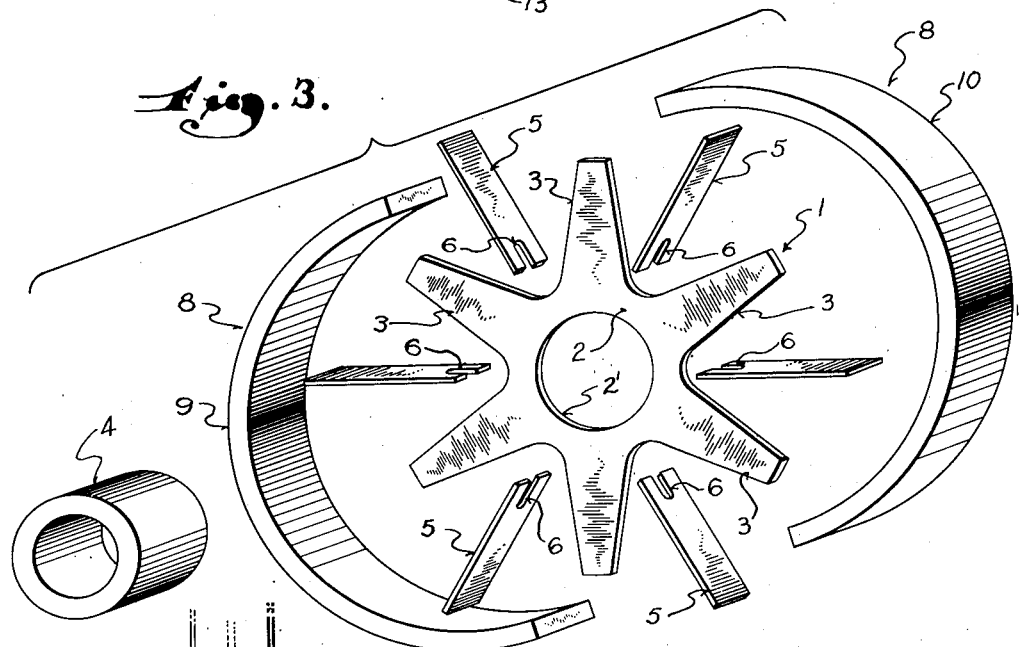
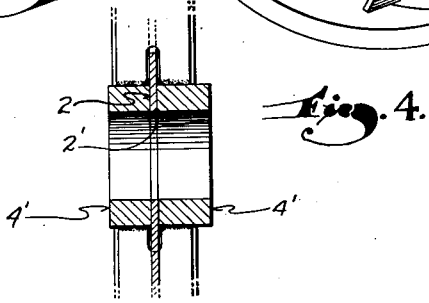
Inventor
Burt E. Hoover
By Ira Shulton Jones
Attorney Patented May 9, 1950

2,506,641

UNITED STATES PATENT OFFICE 2,506,641

FABRICATED GEAR AND METHOD OF MAKING THE SAME

Burt E. Hoover, Milwaukee, Wis., assignor to Lakeside Bridge & Steel Co., Milwaukee, Wis., a corporation of Wisconsin Application July 27, 1946, Serial No. 686,781

7 Claims. (Cl. 74—449)

This invention relates to gears and refers more particularly to improvements in gears and the methods for making the same.

In the past gears have generally been made from cast gear blanks. There are many objectionable features to this method, however, chief among which are high cost of patterns and the great delays often experienced in the making of patterns and the casting of the gears.

For example, comparatively few foundries are capable of casting blanks for any but small or medium sized gears, and the casting of blanks for large size gears requires much specialized equipment. Moreover, since gears of relatively large size are, as a rule, custom jobs, to be cast a relatively few times, the great expense involved in making patterns cannot be written off over a large number of castings, as would be possible on smaller gears turned out in quantities.

Also, cast gear blanks are likely to contain blowholes which will weaken them unpredictably, causing eventual failure under load, or, if the defect is discovered during the machining process, compelling rejection of blanks which already have represented a sizeable investment in time, labor and materials. Furthermore, the excessive weight of a cast gear makes it costly and difficult to handle, both during machining and in final assembly.

With these and other objections to cast gear blanks in mind, it is an object of this invention to provide a method of fabricating gears or wheels from plate and strip materials welded together.

Another object of this invention resides in the provision of an inexpensive method for quickly producing gear blanks without entailing the use of foundry facilities.

Still another object of this invention resides in the provision of an inexpensive fabricated gear blank or wheel which can be produced with welding equipment alone and which will be equal in strength and durability to a cast gear blank or wheel.

It is also an object of this invention to provide an inexpensive gear or wheel which will have considerably less weight than conventional gears or wheels of comparable size.

A further object of this invention resides in the provision of a superior gear, pulley or wheel which will be cheap and rigid and which will require less material than cast gears or wheels.

A further object of this invention resides in the production of high strength gears more cheaply than cast gears of equivalent size and strength by fabrication of the gears which makes possible the use of low carbon steel for all but the rims of the gears.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates two complete examples of the physical embodiment of the invention constructed in accordance with the best modes so far devised for the practical application of the principles thereof, and in which:

Figure 1 is a plan view of a gear produced in accordance with the method of this invention;

Figure 2 is a sectional view of such a gear taken along the line 2—2 in Figure 1;

Figure 3 is an exploded perspective view of the parts from which the gear or gear blank is fabricated; and Figure 4 is a fragmentary sectional view illustrating a slightly modified construction.

Referring now to the accompanying drawing, in which like numerals indicate like parts throughout the several views, the numeral 1 designates generally a web which is preferably formed from a single piece of sheet material cut to provide a central portion 2 and a plurality of radial spokes 3 extending outwardly therefrom.

A substantially tubular hub 4 is suitably bonded, as by welding, to the central portion 2 of the web to dispose the web generally normal to the axis of the hub. A hole 2' of a size to receive the hub 4 is preferably cut through the central portion 2 of the web to enable positioning of the web in any desired location between the ends of the hub. Obviously, the web may be bonded flatwise against one end of the hub if desired, or short hub forming sections 4' may be welded to opposite sides of the medial portion 2 of the web in axial alignment with one another as shown in Figure 4. In this case, the hole 2' in the web is made substantially the same size as the bore of the hub.

The blank or wheel is provided with thrust resisting spokes or ribs 5 formed from narrow lengths of plate material. In the preferred embodiment these ribs 5 are substantially rectangular, (see Figures 2 and 3) but they may be given any suitable shape. A longitudinal notch 6 is cut or otherwise formed at the inner or hub end of each rib.

The ribs 5 are set in place on the hub between the web spokes 3 with their flat sides at right angles to the plane of the web. The notch 6 in each rib thus receives the central portion 2 of the web, so that the hub end of the rib 5 may abut against the cylindrical side of the hub 4, to which it is bonded as by means of welds 7.

The rim or felly 8 may be made up from one or more pieces of strip or plate material, or a forged ring may be used if it is desired to cut high strength teeth in the rim. In the embodiment shown, this rim is formed of two strips 9 and 10 bent to the desired radius of the wheel and bonded together at their abutting ends as at 11 and 12 to form a circular felly.

The rim 8 is bonded to the outer ends of the spokes and ribs to complete the assembly, and gear teeth 13 may then be cut in the felly in a known manner after turning down of the rim to the proper diameter. It is to be understood of course that the outer extremities of the spokes and ribs are equidistant from the center of the hub to dispose the rim in concentric relation to the hub.

The method for making the gear blank or wheel described above will be clear by reference to Figure 3, and preferably is carried out by first welding the hub to the web, inside the central aperture thereof; setting the flat thrust resisting ribs in place on the hub between the spokes of the web and welding the ribs to the hub; and welding the rim to the outer extremities of the spokes and ribs to complete the fabrication of the blank or wheel. Teeth may then be cut in the rim to finish the gear.

This method of making gears or gear blanks also lends itself to the production of gears, pulleys or wheels in quantity, for which purpose it will be understood that suitable fixtures are employed to hold the various parts in their proper positions for welding.

A gear or wheel produced by this process will be comparatively light, yet rigid and durable. Its structural characteristics can be readily calculated and controlled by selection of the size and type of material, by the shape of the web and spokes, and by heat treatment of the materials. Torsion forces are absorbed by the web spokes 3, while the ribs 5 impart rigidity to the gear or wheel and absorb thrust forces.

From the foregoing description taken together with the accompanying drawing it will be readily apparent that practice of the improved method of this invention produces an exceptionally strong but light weight gear or wheel which can be made more quickly and cheaply than a casting and which will overcome many of the objectionable features of a cast gear blank or wheel.

What I claim as my invention is:

1. A fabricated gear blank or wheel comprising: a tubular hub; a web cut from a single piece of plate material to provide a central portion having an aperture of a size to receive the hub, and spokes radiating from said central portion; means bonding the hub to the web inside the apertured central portion of the web and with the sides of the spokes lying in planes substantially normal to the axis of the hub; a felly formed of strip material bent to circular shape and having its ends bonded together in abutting relationship; means bonding said felly to the outer ends of the spokes so as to form a wheel; radial thrust resisting ribs extending between the felly and hub intermediate said spokes; and means bonding the ribs to the felly and hub with the flat sides of the ribs substantially perpendicular to the planes of the sides of the spokes and intersected by said planes, and with the central portion of the web received in notches in the hub ends of the ribs.

2. A fabricated gear blank or wheel comprising: a tubular hub; a flat web including a central portion having an aperture therein of a size to fit the exterior of the hub, and a plurality of spokes radiating from said central portion of the web, means bonding the hub to the web inside said apertured central portion of the web; a felly formed of bent strip material; means bonding the felly to the ends of the web spokes so that the felly provides a rim for the wheel; and radial ribs intermediate the spokes extending between the hub and felly and bonded thereto at its ends, said ribs comprising substantially flat rectangular strips set transversely to the web and having longitudinal notches at their hub ends to receive the central portion of the web so that the ends of the strips abut against the hub for bonding thereto.

3. A fabricated gear comprising: a substantially cylindrical hub; a web made from a single piece of plate metal cut to form a central portion having an aperture therein of a size to fit the exterior of the hub, and a plurality of spokes radiating from said central portion; means bonding said hub to the web inside the aperture thereof and with the web spokes lying in a plane normal to the hub axis and between the ends of the hub; a felly formed from strip material bent to circular shape and having its ends welded together; means bonding said felly to the outer ends of the spokes; substantially flat radial ribs, bonded at their ends to the hub and felly respectively between said spokes and with the flat sides of the ribs set transversely to the plane of the web; and gear teeth on the felly.

4. A fabricated gear blank or wheel comprising: a web cut from a single sheet of flat material to provide radial spokes; a hub bonded to the central portion of said web; a plurality of strips bent and bonded together to collectively form a circular rim; means bonding said rim to the ends of the spokes; and substantially flat ribs disposed at right angles to the web and bonded to the hub and rim intermediate said spokes, each of said ribs having its laterally outer end circumferentially spaced from its adjacent spokes.

5. A fabricated wheel comprising: a rim; a hub; and means joining the rim and hub together in concentric relation to one another, said means including a plurality of spokes having their flat sides generally transverse to the hub axis and bonded to both the rim and hub, and a plurality of flat substantially radial ribs between said spokes and bonded at their opposite ends to the rim and hub with their flat sides substantially parallel to the hub axis and transverse to the flat sides of the spokes, said ribs having their outer ends circumferentially spaced from the spokes.

6. A fabricated gear comprising: a rim; a tubular hub; means joining the rim and hub together in concentric relation to one another including, a web comprising a plurality of spokes generally transverse to the hub axis and bonded to both the rim and hub, and a plurality of substantially flat radial ribs intermediate the spokes and having their outer ends circumferentially spaced from the spokes, said ribs being bonded at their opposite ends to the rim and hub with their flat sides parallel to the hub axis; and gear teeth on the rim.

7. A fabricated gear blank or wheel comprising: a rim; a hub; and means joined between the rim and hub to position the hub inside the rim and concentric thereto, said means comprising a number of arms of substantially flat sheet material extending substantially radially between the rim and hub, alternate arms extending substantially edgewise between the flat sides of the arms adjacent thereto, and with the flat sides of said alternate arms generally crosswise of the hub axis, the outer ends of all of the arms being spaced circumferentially from one another.

BURT E. HOOVER.

REFERENCES CITED

The following references are of record in the file of this patent:

UNITED STATES PATENTS

| Number | Name | Date |
|---|---|---|
| 429,408 | Avery | June 3, 1890 |
| 449,322 | Harris et al. | Mar. 31, 1891 |
| 1,922,812 | Kennedy | Aug. 15, 1933 |
| 2,201,247 | Short | May 21, 1940 |

FOREIGN PATENTS

| Number | Country | Date |
|---|---|---|
| 111,220 | Germany | June 11, 1899 |